Figure 1:
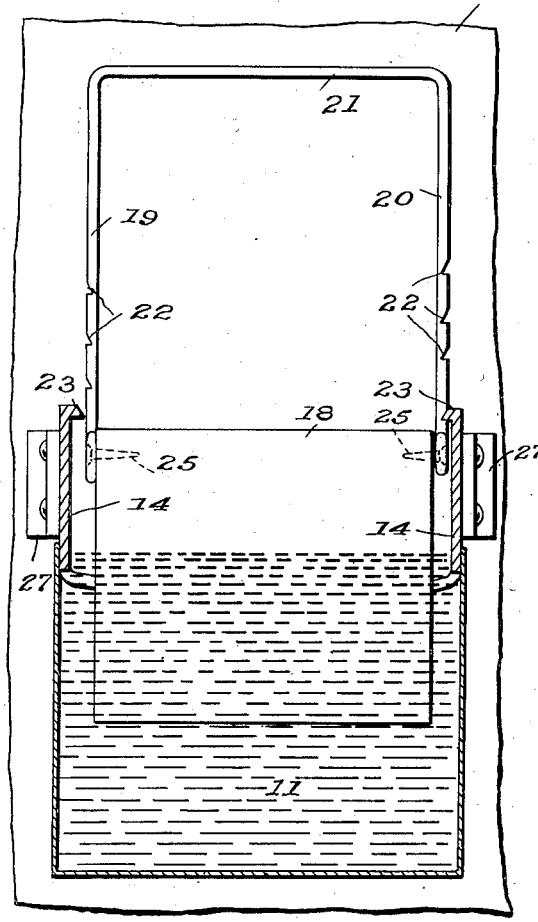

June 2, 1936.  A. H. HOLMAN  2,043,173
METHOD OF AND APPARATUS FOR COLLECTING MATERIAL EXUDING FROM TREES
Filed Oct. 1, 1935

Inventor
ALEX H. HOLMAN

By Samuel Lebowitz
Attorney

Patented June 2, 1936

2,043,173

UNITED STATES PATENT OFFICE 2,043,173

METHOD OF AND APPARATUS FOR COLLECTING MATERIAL EXUDING FROM TREES

Alex H. Holman, Pelham, Ga., assignor of one-tenth to John B. Cullen, Washington, D. C.

Application October 1, 1935, Serial No. 43,084

14 Claims. (Cl. 47—10)

This invention relates to an improved method of and apparatus for collecting material exuding from trees, in the nature of saps, gums, resins and the like.

It is the object of my invention to provide a novel mode of collecting the above materials yielded in nature by certain trees so that the rate of yield is increased many times. Although my invention is applicable to all types of trees including maple and rubber, it is particularly applicable to pine trees which yield an oleo-resinous substance, sometimes designated as crude turpentine, from which turpentine is derived.

It is a further object of my invention to diminish the amount of attention and maintenance costs required by the trees in the course of their productive period.

It is a further object of the invention to increase the life of the trees so that their productiveness may be extended over a greater period of years. Furthermore, by the instant invention, the yield of the trees is utilized most efficiently.

According to the methods of the prior art, the trunk of the pine tree is hacked or chipped periodically to form incisions therein, preferably V-shaped, to provide an outlet for the exudation of the material stored in the tree. The flow of the material is slow, particularly when the gummy material oxidizes and hardens, requiring additional chipping at a higher point of the tree trunk. Such operations affect detrimentally the life of the tree, and even while it is producing the sap, its full capacity of yield is never realized. Furthermore, the frequent hacking or chipping which is required necessitates a high maintenance force with its attendant costs.

Efforts have been made to eliminate the above objections by excluding air from the incision or wound in the tree by arranging a container in close proximity thereto for trapping the exuded material while seeking to prevent a drying of the wound and a consequent clogging of the flow. However, these attempts have proven impractical for several reasons, for example, the rigorous requirements of the outdoor application, the coarse and uneven character of the tree barks, and the wide difference in form and characteristics of the trees of even the same species. Also the drying out or oxidation of the sap was found not to depreciate to a practical extent.

By the instant invention, the objections noted above are eliminated with ease and certainty. By capping a special container having a liquid medium therein, such as water or other aqueous body, onto the tree trunk over the incision, and by raising the level of the liquid above that of the incision, an effective seal against the contact of air with the wound is obtained. The sap flows into the container with the liquid therein, and since the two fluids are immiscible they may be segregated after the conclusion of the collecting operation. Should the two fluids be miscible, they may be separated by any known chemical process. In the course of experimentation over an extended period of time, I obtained five times as great a yield of sap by the use of my invention from the same pine trees as compared with the yield derived from wounds exposed to the surrounding air.

It is a further object of my invention to provide a device of rugged construction particularly adapted to execute efficiently my novel method.

Figure 3:
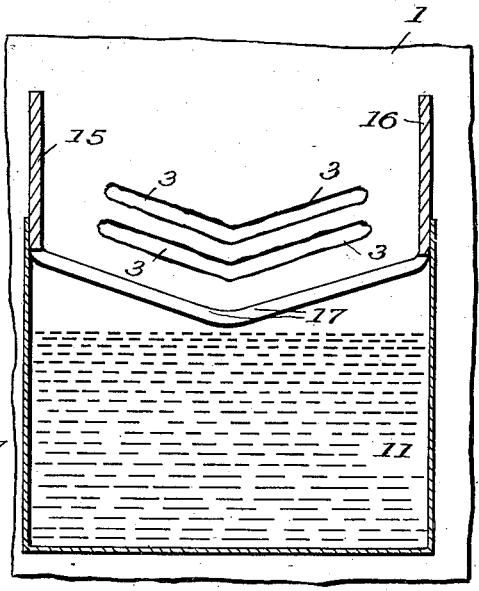
Figure 2:
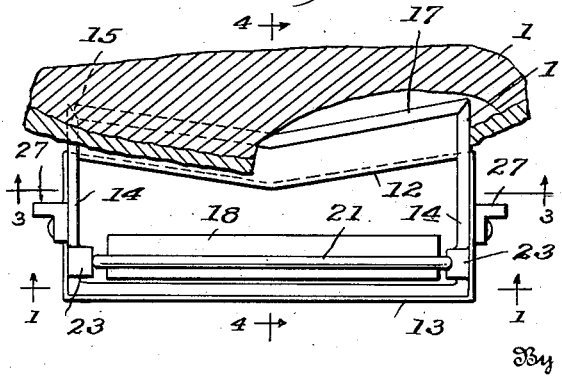
Figure 4:
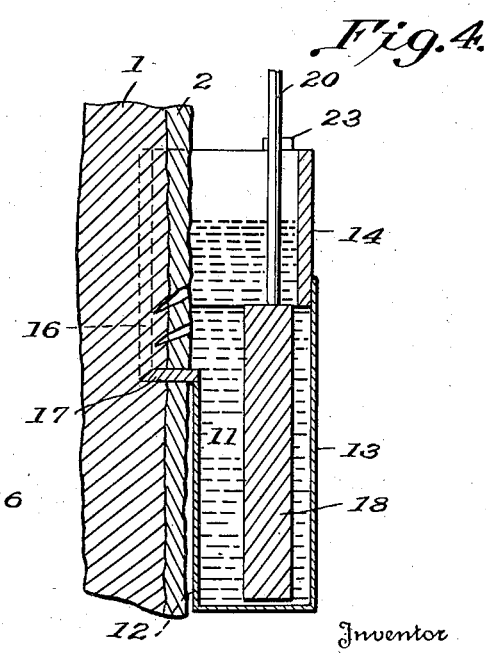

Other objects and purposes will appear from a more detailed description of the invention following hereinafter, taken in conjunction with the accompanying drawing wherein:

Fig. 1 is a front view in section of the device mounted upon a tree with the front wall removed, along line 1—1 of Fig. 2, Fig. 2 is a plan view of Fig. 1, showing a portion of the tree cut away, Fig. 3 is a front view in section along line 3—3 of Fig. 2, and Fig. 4 is a longitudinal sectional view along the 4—4 of Fig. 2.

In the several figures of the drawing the trunk of a tree is designated by 1 having the bark 2 upon the exterior thereof with the incisions 3 hacked or chipped therein, preferably in the form of a V, in a manner well known in the art. In order to collect the material exuding from the tree, a container 11 is attached thereto. This container is formed by a lateral wall 12 adjacent the tree trunk which is shown as V-shaped in Fig. 2 to conform substantially to the periphery of the trunk. This lateral wall may be given any other desired shape or it may be plane. The container may be an open-topped receptacle formed by another lateral wall 13 opposite the wall 12, side walls and a bottom.

A frame 14 is mounted at the top of the container 11 and it serves to provide an opening in the upper portion of the lateral wall 12 adjacent the tree trunk. This frame is formed of thick metallic material of sufficient strength to be driven into the trunk of the tree at the knife edges 15 and 16 outlining the sides of the opening and the knife edge 17 at the bottom thereof, which in the preferred embodiment is of V-shape to conform substantially to the V-shaped configuration of the incisions in the tree trunk. The reinforcing frame 14 may extend around the sides and the front lateral wall 13 of the container upon the outside or inside thereof, or may extend simply for a short length along the wall 13, so long as sufficient rigidity is had thereby to take up the driving forces thereupon in order to force the knife edges into the body of the tree trunk. The container 11 is preferably made from sheet galvanized iron for the sake of economy although, if desired, it may be made from the same heavy sheet metal of which the reinforcing frame 14 is built. In the illustrated embodiment, the galvanized sheet container 11 is soldered to the reinforcing frame 14 at all edges of the container contacting herewith in order to form a liquid-tight joint therebetween.

In order to carry out my invention, the container is mounted upon the tree trunk by driving in the knife edges 15, 16, and 17 around the incision in the tree at such a point that the knife edge 17 is slightly below the active incision. A liquid medium extending to a level at or below the knife edge 17, as shown in Fig. 3, is poured into the container either before or after it is mounted upon the tree. This liquid medium is preferably water on account of its availability and cheapness. However, any aqueous solution may be used, depending upon the characteristics desired thereof, such as its freezing temperature, specific gravity and the like. Likewise any liquid medium may be used so long as its combination with the material exuded from the tree does not affect the latter deleteriously.

One convenient manner of realizing the invention is had by providing a plunger 18 which may be inserted into the container 11 preferably adjacent the wall 13 to displace the level of the liquid upwardly to the position shown in Fig. 4, whereupon the incision is effectively sealed from the air. The cross section of the plunger is less than that of the container, providing an adequate space adjacent the lateral wall 12 for the exuded material to drain downwardly or rise upwardly, depending upon its specific gravity, until the collecting operation is concluded. The plunger may be weighted in order to retain it in its submerged position. In the illustrated embodiment, a handle formed by vertical arms 19, 20 and horizontal bar 21 facilitates the manipulation of the plunger. Lips 23 bent from the reinforcing frame 14 are adapted to engage selectively the notches 22 staggered respectively upon the arms 19 and 20, thereby obtaining a control of the level of the liquid medium. The handle is attached to the plunger 18 by means such as screws 25 and the springiness thereof makes possible the engagement and release of the lips 23 with the notches 22. Any other arrangement for retaining the plunger within the container may be utilized.

Lugs 27 are fixed to the side walls of the frame 14 in order to render easy a prying off of the container from the tree trunk at the conclusion of the collecting operation.

After a predetermined period when the yield from the tree through the active incision is substantially exhausted, the plunger is removed from the container, thereby dropping the level of the liquid below the knife edge 17. It is then possible to remove the container without any loss of liquid containing the material exuded from the tree. Should this material be immiscible with the liquid medium, the two constituents can be segregated by physical means; otherwise the constituents may be separated by any known chemical processes such as evaporation, distillation and the like.

It is to be understood that the expression of "cutting an incision" as employed in the present specification and claims comprehends any mode of forming such incision as is known in the art, as by boring, hacking, chipping, sawing, chiseling, chopping, piercing or equivalent operation.

While I have described my invention as embodied in concrete form and as operating in a specific manner for purposes of illustration, it should be understood that I do not limit my invention thereto, since various modifications will suggest themselves to those skilled in the art without departing from the spirit of my invention, the scope of which is set forth in the annexed claims.

What I claim is:

1. The method of collecting material exuding from trees which comprises cutting an incision in the trunk of a tree, and covering the incision with a liquid medium to exclude air therefrom, thereby enhancing the flow of the material therethrough.

2. The method of collecting oleo-resinous material from trees which comprises cutting an incision in the trunk of a tree, and covering the incision with a body of water to exclude air therefrom, thereby enhancing the flow of material therethrough.

3. The method of collecting material exuding from trees which comprises cutting an incision in the trunk of a tree, forcing a container frame into the tree over the incision, and covering the incision with a liquid medium confined within the container frame to exclude air from the incision.

4. The method of collecting material exuding from trees which comprises cutting an incision in the trunk of a tree, forcing a knife-edged frame into the trunk over the incision, and raising the level of a liquid medium in a container below the frame above the level of the incision to effect a sealing thereof from the surrounding air.

5. The method of collecting material exuding from trees which comprises cutting an incision in the trunk of a tree, forcing a knife-edged frame into the trunk over the incision, raising the level of a liquid medium in a container below the frame above the level of the incision to effect a sealing thereof from the surrounding air, lowering the level of the liquid below the outlines of the knife-edged frame at the conclusion of the collecting operation, and detaching the frame from the tree.

6. The method of collecting material exuding from trees which comprises cutting an incision in the trunk of a tree, forcing a knife-edged frame into the trunk over the incision, raising the level of a liquid medium in a container below the frame above the level of the incision to effect a sealing thereof from the surrounding air, lowering the level of the liquid below the outline of the knife-edged frame at the conclusion of the collecting operation, detaching the frame from the tree, and drawing off the liquid from the exuded material.

7. The method of collecting material exuding from trees which comprises cutting an incision in the trunk of a tree, forcing a knife-edged frame into the trunk over the incision, covering the incision with a liquid medium to effect a sealing thereof from the surrounding air, thereby enhancing the exudation of the material through said incision, and segregating the exuded material from the liquid medium.

8. The method of collecting crude turpentine exuding from pine trees which comprises cutting an incision in the trunk of a tree, forcing a knife-edged frame into the trunk over the incision, raising the level of a body of water in a container below the frame above the level of the incision to effect a sealing thereof from the surrounding air, thereby enhancing the flow of the crude turpentine through the incision, lowering the level of the water below the outline of the knife-edged frame at the conclusion of the collecting operation, and detaching the frame from the tree.

9. In a device for collecting material exuding from trees, a container for a liquid medium, said container having an opening in a lateral wall at the upper portion thereof, a knife edge outlining the bottom and at least a portion of the side boundaries of said opening, and means associated with said container for controlling the level of the liquid medium within said container.

10. In a device for collecting material exuding from trees, a container for an aqueous medium, said container having an opening in a lateral wall adjacent the top thereof, a knife edge outlining the bottom and at least a portion of the side boundaries of said opening, said knife edge adapted to be inserted into the trunk of a tree adjacent an incision therein, and a plunger adapted to be inserted into a portion of the container to displace the liquid therein to a level above the bottom of the opening sufficiently high to cover the incision in the tree trunk.

11. In a device for collecting material exuding from trees, a container for an aqueous medium, said container having an opening in a lateral wall adjacent the top thereof, a knife edge outlining the bottom and at least a portion of the side boundaries of said opening, said knife edge adapted to be inserted into the trunk of a tree adjacent an incision therein, and a plunger of lesser cross-section than said container adapted to be inserted therein adjacent the lateral wall opposite said first-mentioned lateral wall to displace the liquid therein to a level above the bottom of the opening sufficiently high to cover the incision in the tree trunk, the space in said container not occupied by the plunger adapted to take up the material exuded from the tree.

12. In the device set forth in claim 11, means provided on said container cooperating with means on said plunger for retaining said plunger in its submerged position within the liquid medium.

13. The combination set forth in claim 11, wherein said first-mentioned lateral wall is shaped to conform substantially to the outer contour of the tree trunk, and the opposite lateral wall adjacent the plunger is substantially plane.

14. In a device for collecting a material exuding from trees, a container for an aqueous medium, a reinforced frame at the top of said container presenting an opening adjacent the upper end of one of the lateral walls of said container, vertical knife edges at the sides of said opening and a V-shaped knife edge at the bottom thereof conforming substantially to a V-shaped incision chipped in the trunk of a tree, said knife edges adapted to be driven into the tree trunk in embracing position of the incision, thereby mounting said container on the tree trunk in position for receiving the material exuding from the incision, and a plunger of lesser cross-section than said container adapted to be inserted therein adjacent the lateral wall opposite said first-mentioned lateral wall to displace the liquid therein to a level above the V-shaped knife edge sufficiently high to cover the incision in the tree trunk.

ALEX H. HOLMAN.